(12) United States Patent
Gitnes (10) Patent No.: US 9,470,272 B2
(45) Date of Patent: Oct. 18, 2016

(54) TORQUE LIMITER RESPONSIVE TO OUTPUT TORQUE

(71) Applicant: Moog Inc., East Aurora, NY (US)

(72) Inventor: Seth Gitnes, Snohomish, WA (US)

(73) Assignee: Moog Inc., East Aurora, NY (US)

( * ) Notice: Subject to any disclaimer, the term of this patent is extended or adjusted under 35 U.S.C. 154(b) by 468 days.

(21) Appl. No.: 13/937,638

(22) Filed: Jul. 9, 2013

(65) Prior Publication Data

US 2015/0018155 A1    Jan. 15, 2015

(51) Int. Cl.
*F16D 7/00* (2006.01)
*B64C 13/28* (2006.01)
*F16D 7/02* (2006.01)
*F16H 35/10* (2006.01)

(52) U.S. Cl.
CPC ............... *F16D 7/00* (2013.01); *B64C 13/28* (2013.01); *F16D 7/024* (2013.01); *F16H 35/10* (2013.01); *Y02T 50/44* (2013.01)

(58) Field of Classification Search
None
See application file for complete search history.

(56) References Cited

U.S. PATENT DOCUMENTS 4,480,733 A * 11/1984 Grimm .................. B64C 13/28
                                                    192/223.3
6,722,485 B1    4/2004 Gitnes et al.

FOREIGN PATENT DOCUMENTS

| DE | 102005041698 | 3/2007 |
|---|---|---|
| EP | 1310699 | 5/2003 |
| JP | S59127952 | 8/1984 |
| JP | S60256647 | 12/1985 |
| WO | 8100899 | 4/1981 |

OTHER PUBLICATIONS

Written Opinion issued in PCT/US2014/045372 on Oct. 20, 2014.

* cited by examiner

*Primary Examiner* — Colby M Hansen
(74) *Attorney, Agent, or Firm* — Hodgson Russ LLP (57) ABSTRACT

A torque limiter limits transmission of torque between an input shaft an output shaft. The torque limiter may be incorporated in a geared rotary actuator for actuating an aircraft control surface. The torque limiter is responsive to output torque associated with the output shaft instead of input torque associated with the input shaft. The torque limiter includes a structural ground and a gear assembly for transmitting rotational motion of the input shaft to the output shaft. The gear assembly includes a reference gear coupled to the structural ground such that movement of the reference gear relative to the structural ground is dependent upon an output torque at the output shaft. The reference gear is stationary relative to the structural ground when the output torque is below an output torque limit, and the reference gear moves relative the structural ground when the output torque exceeds the output torque limit.

14 Claims, 12 Drawing Sheets

TORQUE LIMITER RESPONSIVE TO OUTPUT TORQUE

FIELD OF THE INVENTION

The present invention relates to torque limiting mechanisms, especially those used in geared rotary actuators ("GRAs") for actuating aircraft control surfaces.

BACKGROUND OF THE INVENTION

GRAs are used, for example, in aircraft for actuating flaps, slats, and other aerodynamic control surfaces. GRAs typically incorporate a torque limiter for limiting transmission of torque between an input shaft and an output shaft of the GRA in the event of a malfunction. Conventional torque limiting devices include a disc brake pack having multiple brake discs utilizing frictional contact between adjacent discs for limitation of torque transmission. Such torque limiting devices have several inherent problems. Because the friction coefficient is very sensitive to lubrication, changes in the lubrication environment can cause the friction coefficient to drop below a critical value required to provide a positive torque limit. This can cause the torque limiter to exceed the maximum torque limit setting. If too little lubrication is present in the disc brake pack and moisture is present, the disc brake pack can freeze up, causing nuisance lock-ups. When adequate lubrication is provided to the disc brake pack, considerable viscous drag is present. The viscous drag is not a problem as long as it is accurately predicted and accounted for in the torque limiter setting and power control unit ("PCU") sizing, however, such viscous drag causes inefficiency in the system and higher limit loads on components downstream of the torque limiter.

Known torque limiting mechanisms respond to input torque to the GRA rather than GRA output torque. Consequently, the lock-up torque limit setting must be significantly higher than the maximum operating torque of the GRA, and therefore the GRA is designed with a relatively large limit output torque. As a result, each GRA has a greater weight associated therewith, and structure downstream from the GRA is increased. Given that an aircraft may have many GRAs, for example thirty or more, a cumulative weight cost is imposed on the aircraft design.

There is a need for a torque limiter that solves the problems described above.

SUMMARY OF THE INVENTION

The present invention provides a torque limiter that limits transmission of torque between an input shaft rotatable about an input axis and an output shaft rotatable about an output axis, and does so in a manner that solves the problems discussed above. In an illustrative embodiment of the present invention, the torque limiter is incorporated in a GRA for actuating an aircraft control surface, e.g. a flap or a slat movable relative to a fixed wing. The torque limiter of the present invention is characterized by the fact that it is responsive to output torque associated with the output shaft instead of input torque associated with the input shaft.

A torque limiter of the present invention generally comprises a structural ground and a gear assembly for transmitting rotational motion of the input shaft to the output shaft. The gear assembly includes a reference gear coupled to the structural ground such that movement of the reference gear relative to the structural ground is dependent upon an output torque at the output shaft. The reference gear is stationary relative to the structural ground when the output torque is below an output torque limit, and the reference gear moves relative the structural ground when the output torque exceeds the output torque limit.

In accordance with a specific embodiment of the invention, the gear assembly may also include an input gear rotated relative to the structural ground in response to rotation of the input shaft, a driven gear associated with the output shaft such that the output shaft is rotated in response to rotation of the driven gear, and at least one transmitting gear engaging the input gear, the reference gear and the driven gear such that rotation of the input shaft causes rotation of the output shaft without causing movement of the reference gear relative to the structural ground unless the torque limit is exceeded. The reference gear moves relative to the structural ground when the torque limit is exceeded, for example the reference gear may rotate about its axis relative to the structural ground. The gear assembly may be configured as a planetary gear assembly in which the input gear is arranged as a sun gear on the input shaft, the reference gear is arranged as a ring gear about the input gear, and the at least one transmitting gear includes a plurality of planet gears arranged between the input gear and the reference gear. The input gear, reference gear, and driven gear may be arranged coaxially along a main axis, and the planet gears may extend axially in a direction parallel to the main axis of the assembly.

In a further aspect of the present invention, the torque limiter may comprises a lockout mechanism for preventing transmission of torque between the input shaft and the output shaft after the torque limit has been exceeded, wherein the lockout mechanism redirects torque from the input shaft to the structural ground after the torque limit has been exceeded. The lockout mechanism may comprise a pawl carrier arranged to rotate with the input shaft, and at least one pawl member pivotally coupled to the pawl carrier. The lockout mechanism may further comprise a lockout ring including at least one stop extending radially inward, wherein the lockout ring is arranged along the main axis and is axially displaceable from a non-lockout position wherein each stop is radially clear of each pawl member to a lockout position wherein each stop radially interferes with each pawl member. A spring may be arranged to urge the lockout ring toward the non-lockout position, and a plurality of ball bearings may be seated between the lockout ring and the reference gear. The ball bearings maintain the lockout ring in the non-lockout position when the lockout ring and the reference gear are in a predetermined angular orientation about the main axis relative to one another, and displace the lockout ring toward the lockout position when the reference gear rotates about the main axis relative to the lockout ring. When activated by rotation of the reference gear, the lockout mechanism may redirect input torque through the lockout ring to the structural ground.

BRIEF DESCRIPTION OF THE DRAWING VIEWS

The invention will be described in detail below with reference to the accompanying drawing figures, in which.

DETAILED DESCRIPTION OF THE INVENTION

FIGS. 1-7 depict a GRA 10 embodying the present invention. GRA 10 may be used in an aircraft control surface actuation system or in other applications involving torque transmission. GRA 10 is configured to transmit torque between an input shaft 12 rotatable about an input axis and an output shaft 14 rotatable about an output axis. In the current embodiment, the input axis and output axis coincide with one another along a main axis 11.

GRA 10 comprises a structural ground in the form of an outer housing 16 that may include a housing shell 18, a housing end plate 20 at an end of housing shell 18, and a spacer ring 22 held in an axially fixed location adjacent housing end plate 20. Spacer ring 22 may define a ring-shaped radial step surface 24. Input shaft 12 may be rotatably supported at an input end of housing 16 by a rotary bearing 13. Output shaft 14 may be rotatably supported at an end of input shaft 12 by another rotary bearing 15.

GRA 10 also comprises a gear assembly for transmitting rotational motion of input shaft 12 to output shaft 14. As shown in the illustrated embodiment, the gear assembly may include an input gear 26, a reference gear 28, a driven gear 30, and at least one transmitting gear 32. Input gear 26 may be fixedly mounted on input shaft 12 or integrally formed with the input shaft such that it rotates relative to housing 16 in response to rotation of the input shaft. Reference gear 28 is coupled to housing 16 such that the reference gear does not move relative to housing 16 unless a torque limit is exceeded. For example, reference gear 28 may be in the form of an internally-toothed ring gear held within housing 16 such that the reference gear will not rotate about main axis 11 relative to housing 16 unless the reference gear is subjected to torque about main axis 11 that exceeds the torque limit. Driven gear 30 is associated with output shaft 14, for example by fixedly connecting the driven gear to output shaft 14 or integrally forming the driven gear with output shaft 14, wherein output shaft 14 is rotated in response to rotation of driven gear 30. As shown in the illustrated embodiment, driven gear 30 may be an internally-toothed ring gear.

The at least one transmitting gear 32 engages input gear 26, reference gear 28 and driven gear 30 such that rotation of input shaft 12 causes rotation of output shaft 14 without causing movement of reference gear 28 relative to the structural ground provided by housing 16 unless the torque limit is exceeded. When the torque limit is exceeded, reference gear 28 moves relative to the structural ground (i.e. housing 16) by rotating about main axis 11 relative to housing 16.

As shown in the figures, the gear assembly may be a planetary gear assembly in which input gear 26 is arranged as a sun gear on input shaft 12, reference gear 28 is arranged as a ring gear about the input gear, and the at least one transmitting gear 32 includes a plurality of planet gears arranged between input gear 26 and the reference gear 28. In the depicted embodiment, the plurality of planet gears (i.e. transmitting gears 32) extend axially in a direction parallel to main axis 11. Input gear 26 and driven gear 30 may be arranged coaxially with one another along main axis 11. Furthermore, reference gear 28 may be arranged coaxially with input gear 26 and driven gear 30 along main axis 11. Transmitting gears 32 may be arranged about input gear 26, and each transmitting gear may include a first toothed portion 32A meshing with input gear 26 and reference gear 28, a second toothed portion 32B meshing only with reference gear 28, and a third toothed portion 32C meshing only with driven gear 30.

As mentioned above, reference gear 28 moves relative to housing 16 when the torque limit is exceeded. Reference gear 28 may be coupled to housing 16 by frictional contact such that the torque limit corresponds to a torque necessary to overcome static friction associated with the frictional contact. The frictional contact may include frictional contact between a cylindrical exterior surface of reference gear 28 and a cylindrical interior surface of housing shell 18. The frictional contact may also include an annular end surface 28A of reference gear 28 and a radial step surface 24 of housing 16. The frictional contact between end surface 28A and radial step surface 24 may be spring-loaded, for example by an axially-loaded spring or spring pack 36. Spring 36 may be a Belleville spring, for example.

Additional reference is now made to FIGS. 8 through 12E. GRA 10 may further comprise a lockout mechanism generally identified by reference numeral 40, for preventing transmission of torque between input shaft 12 and output shaft 14 after the torque limit has been exceeded. Lockout mechanism 40 may operate by redirecting torque from input shaft 12 to the structural ground provided by housing 16 after the torque limit has been exceeded.

Lockout mechanism 40 may comprise a pawl carrier 42 arranged to rotate with input shaft 12, and at least one pawl member 44 pivotally coupled to pawl carrier 42. Lockout mechanism 40 may also comprise a lockout ring 46 including at least one stop 48 extending radially inward, wherein the lockout ring is arranged along main axis 11. In the described embodiment, lockout ring 46 is axially displaceable from a non-lockout position (see FIG. 10A) wherein each stop 48 of lockout ring 46 is radially clear of each pawl member 44 to a lockout position wherein each stop 48 of lockout ring 46 radially interferes with each pawl member 44 (see FIG. 10B). Lockout ring 46 may be mounted in housing shell 18 by axial slide pins 49 received in corresponding external axial grooves in lockout ring 46 and internal axial grooves within housing shell 18, whereby lockout ring 46 is free to move axially through a range, but is prevented from rotating about main axis 11 relative to housing 16. Exactly two pawl members 44, or a different number of pawl members 44, may be provided. If more than one pawl member 44 is provided, the pawl members 44 may be arranged at regular angular intervals about main axis 11. Exactly four stops 48, or a different number of stops 48, may be provided. If more than one stop 48 is provided, the stops 48 may be arranged at regular angular intervals about main axis 11.

Figure 1:
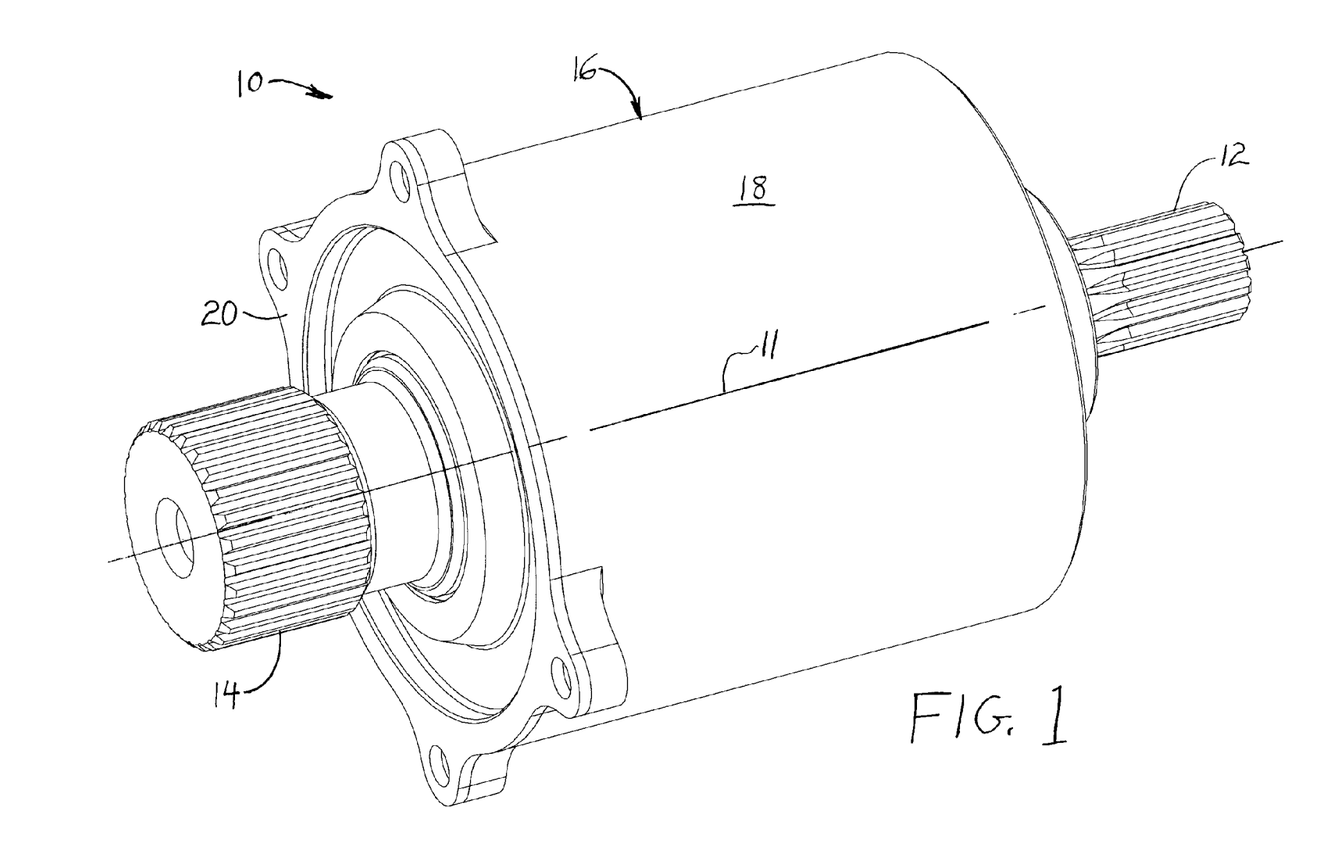
FIG. 1 is a perspective view of a GRA formed in accordance with an embodiment of the present invention.
Figure 2:
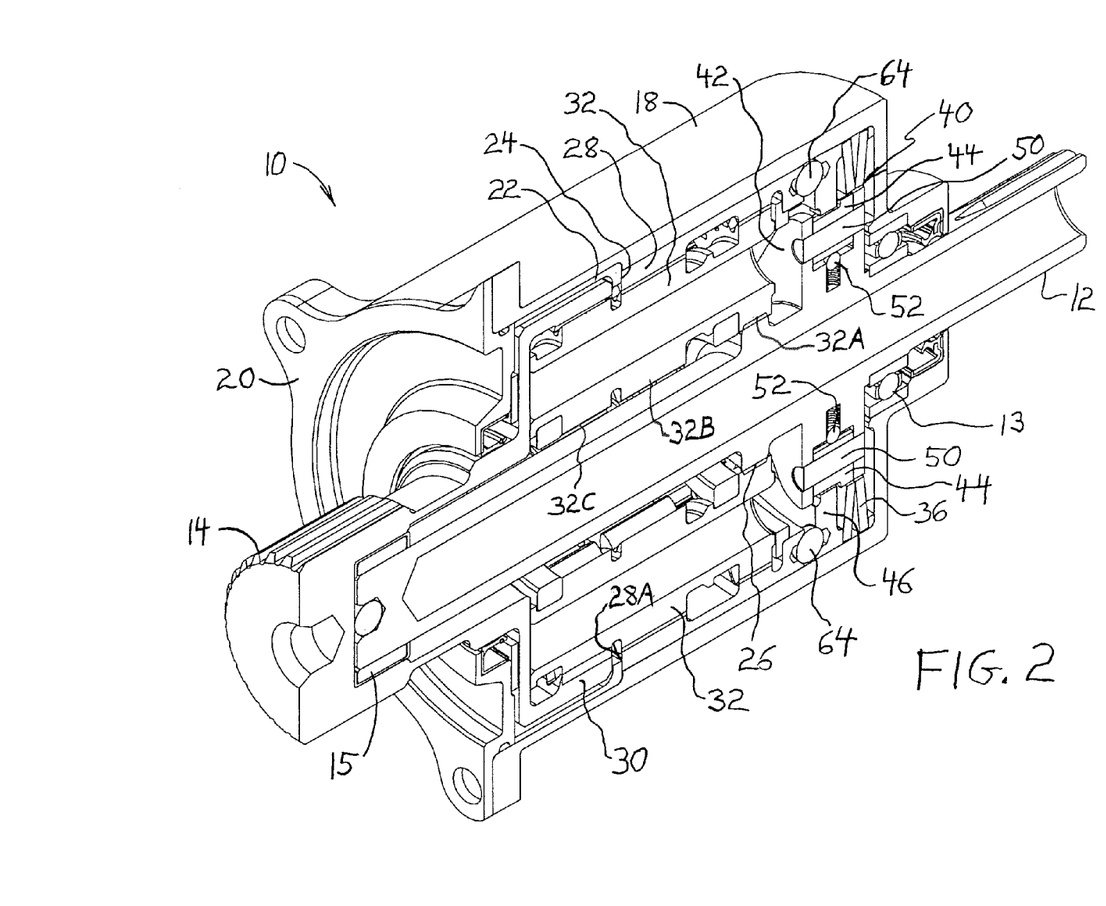
FIG. 2 is a cross-sectioned perspective view showing the GRA of FIG. 1.
Figure 3:
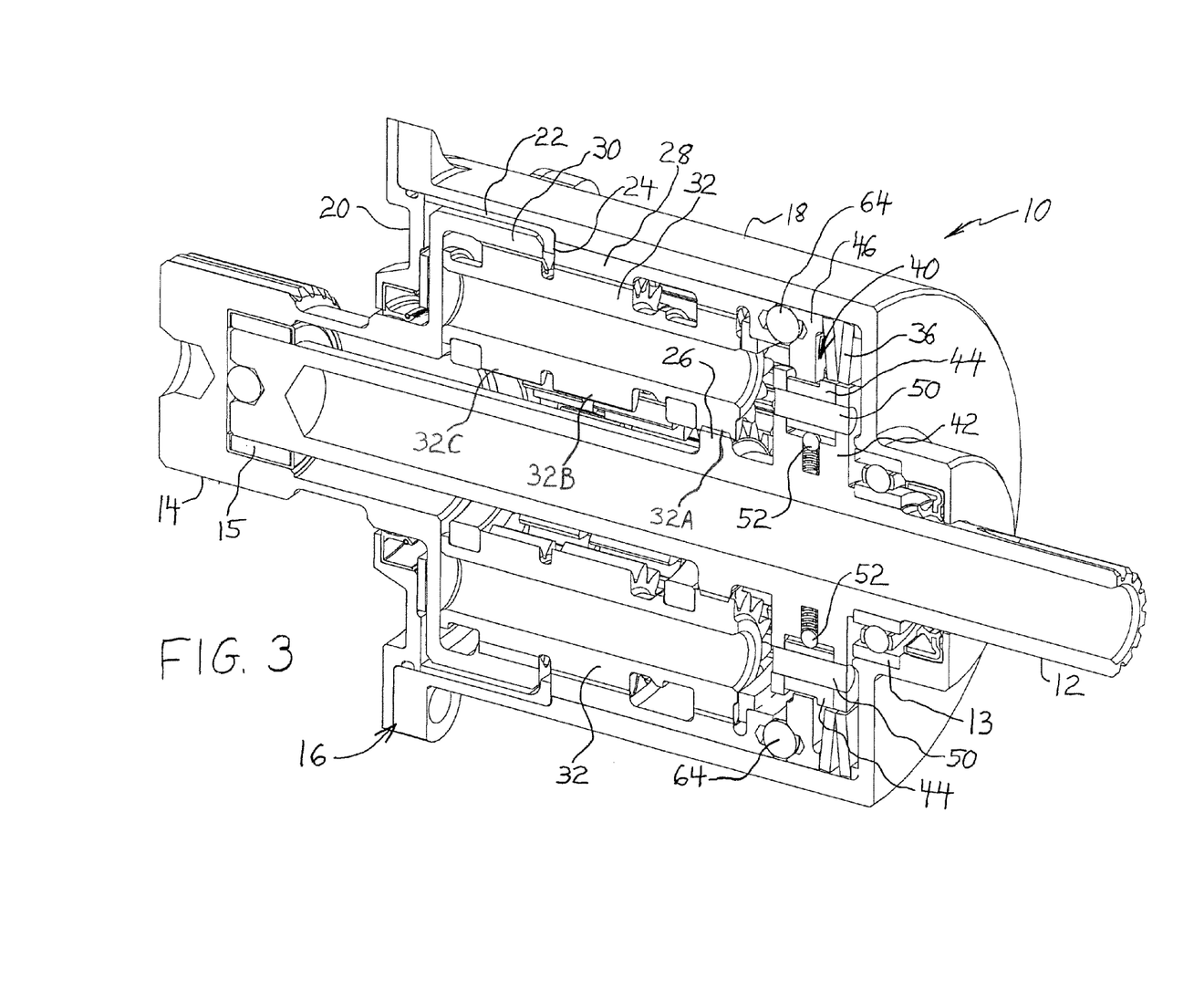
FIG. 3 is another cross-sectioned perspective view showing the GRA of FIG. 1.
Figure 4:
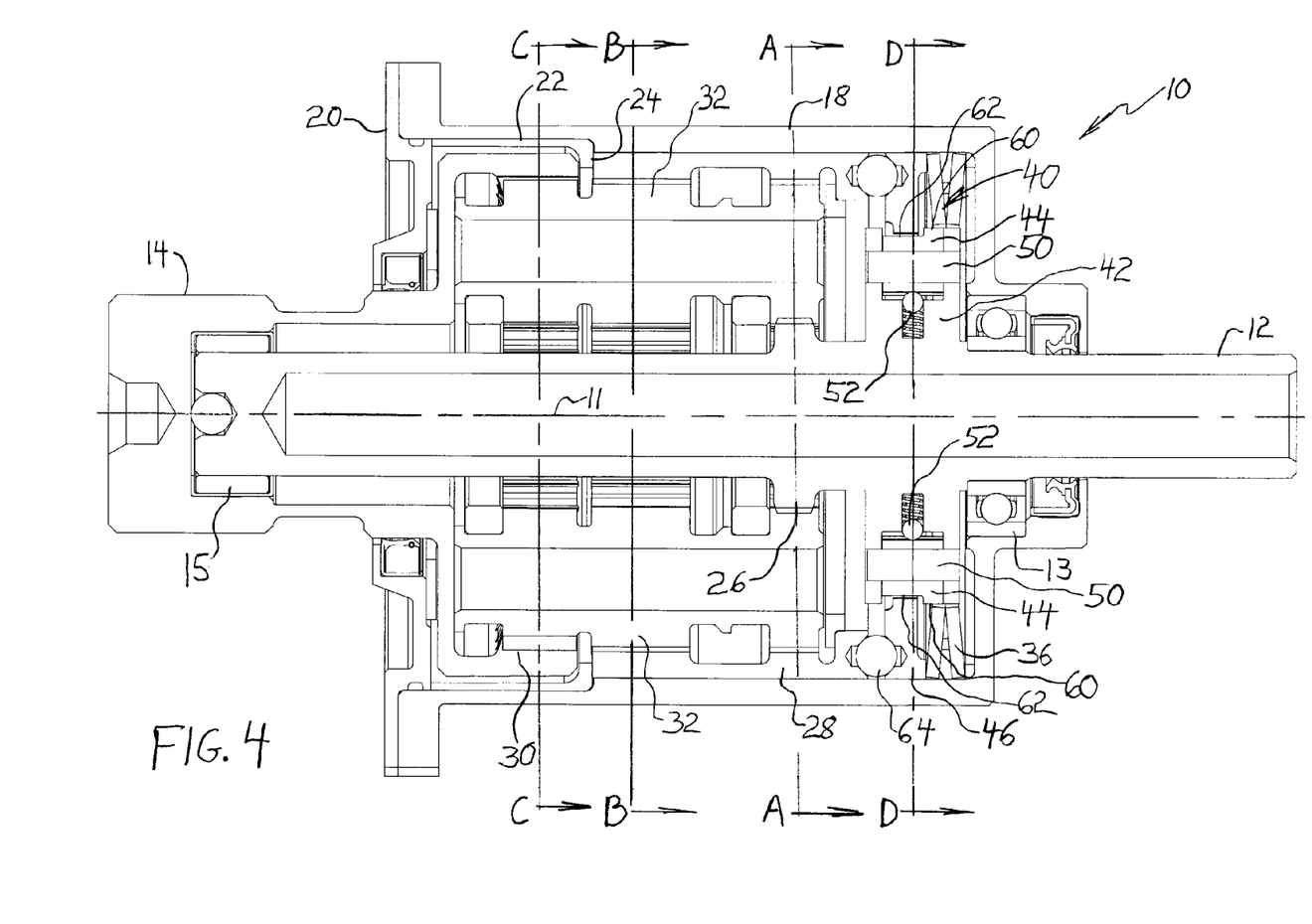
FIG. 4 is a longitudinal cross-sectional view of the GRA shown in FIG. 1.
Figure 5:
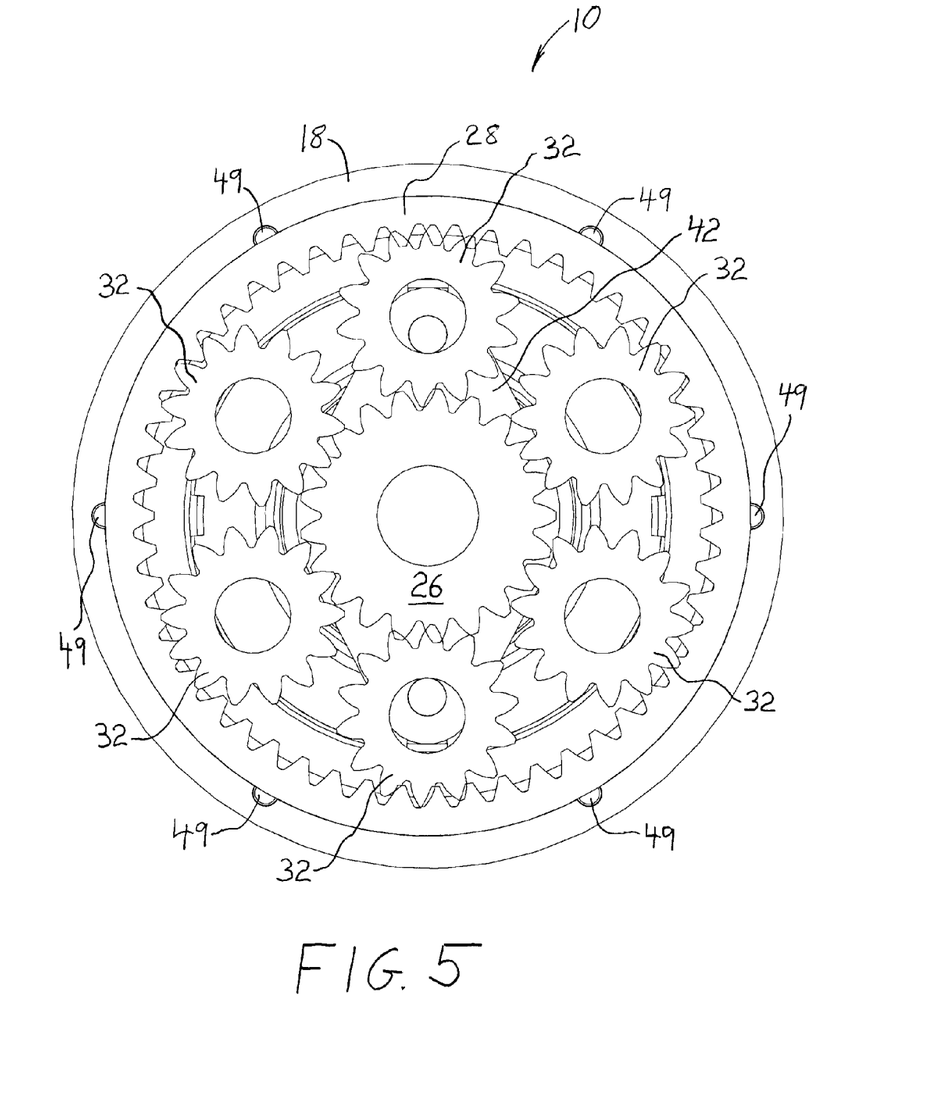
FIG. 5 is a transverse cross-sectional view of the GRA taken generally along the line A-A in FIG. 4.
Figure 6:
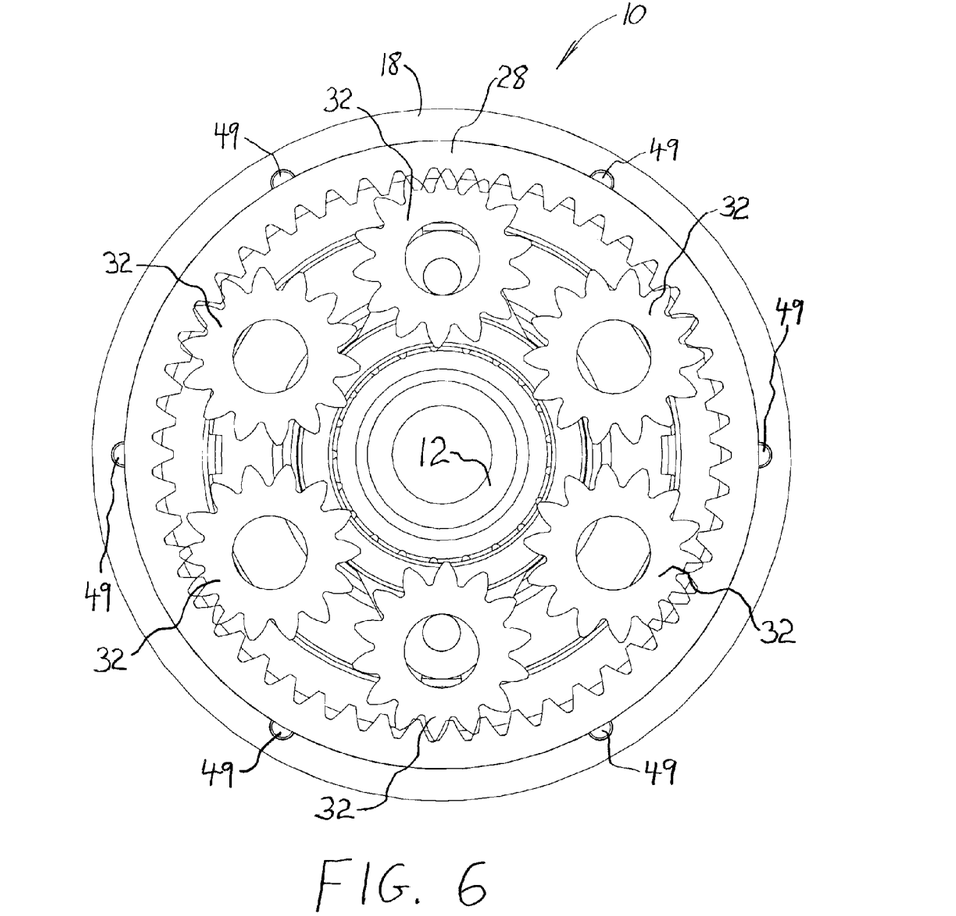
FIG. 6 is a transverse cross-sectional view of the GRA taken generally along the line B-B in FIG. 4.
Figure 7:
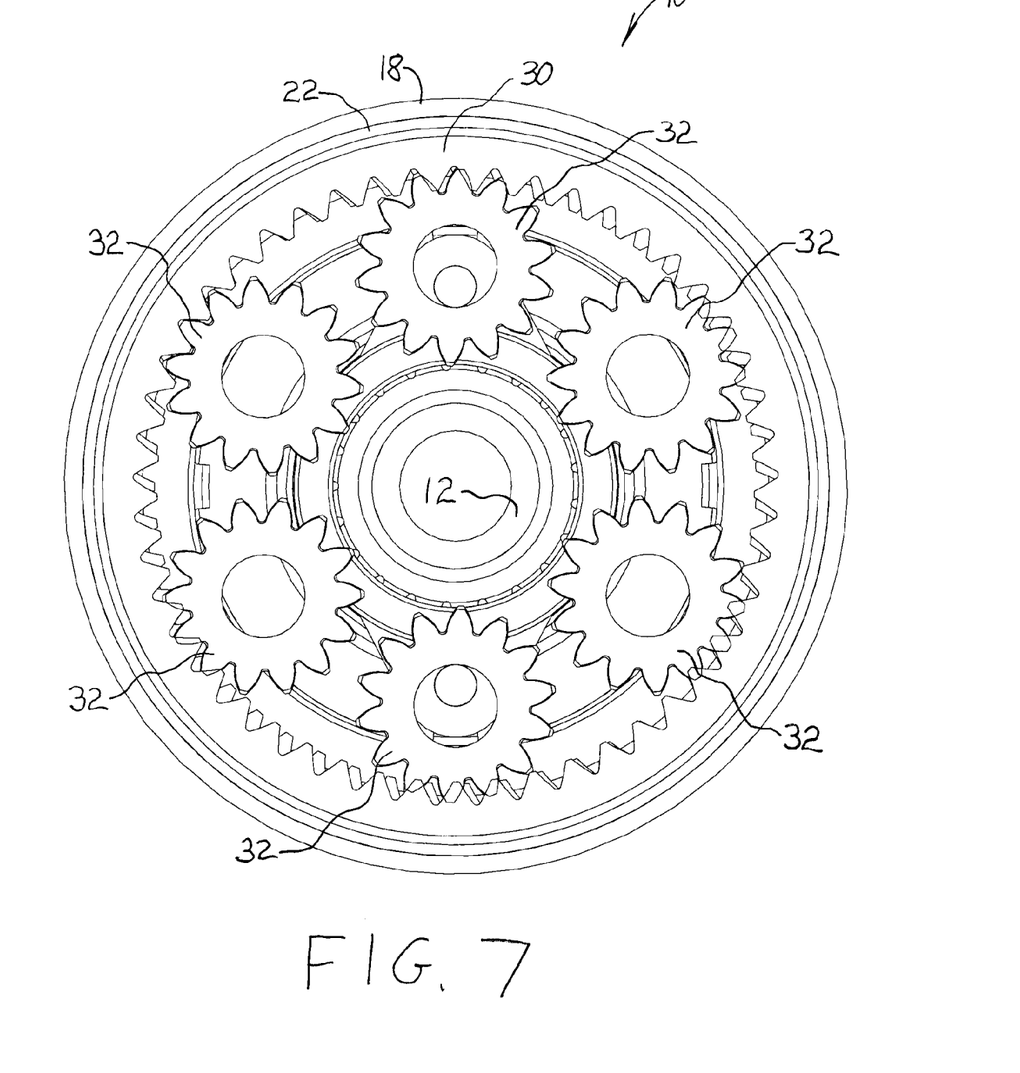
FIG. 7 is a transverse cross-sectional view of the GRA taken generally along the line C-C in FIG. 4.
Figure 8:
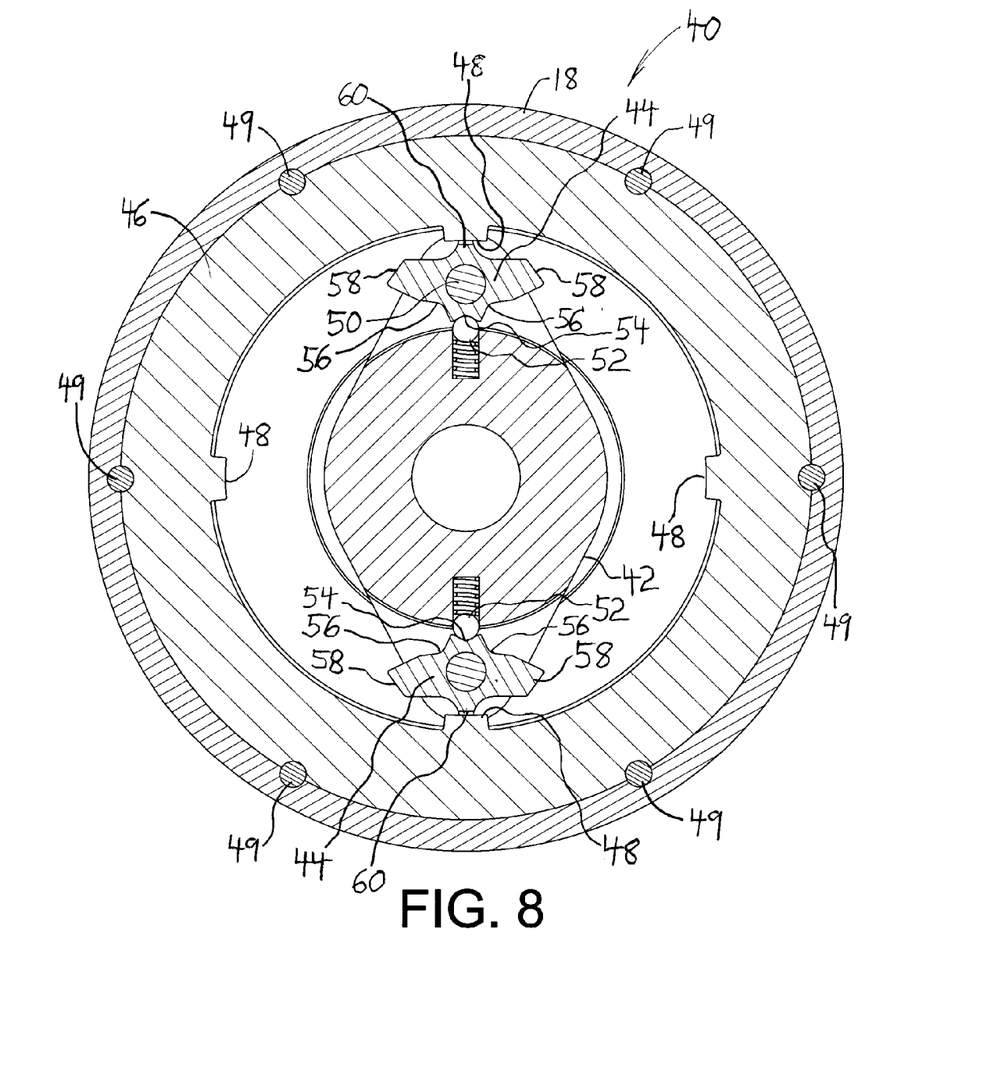
FIG. 8 is a transverse cross-sectional view of the GRA taken generally along the line D-D in FIG. 4.
Figure 9:
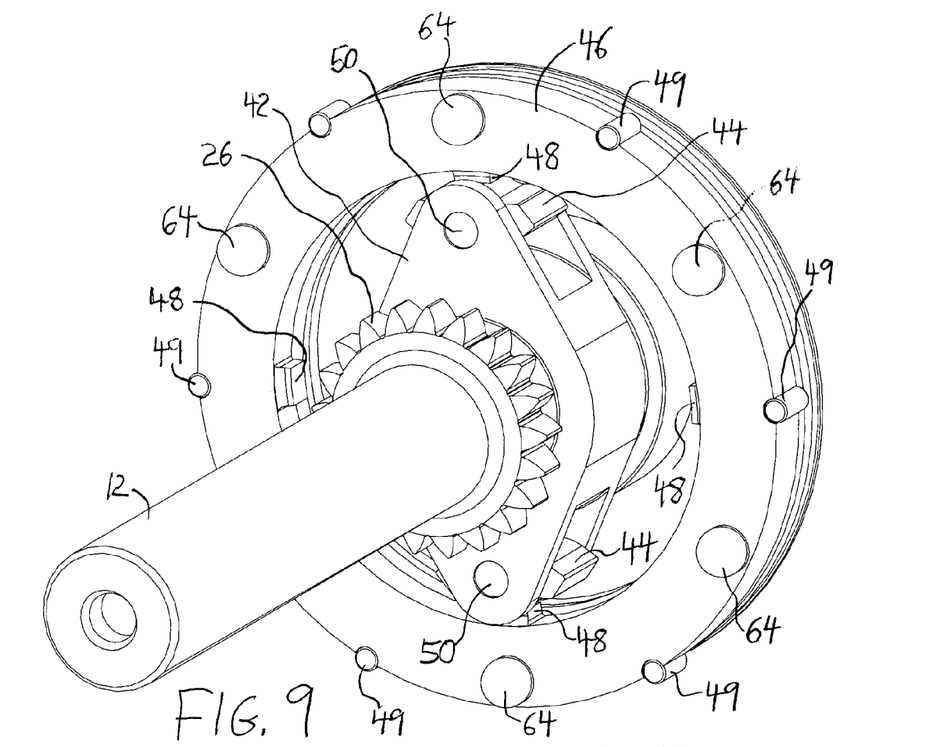
FIG. 9 is a perspective view showing a lockout mechanism of the GRA according to an embodiment of the present invention.
Figure 10A:
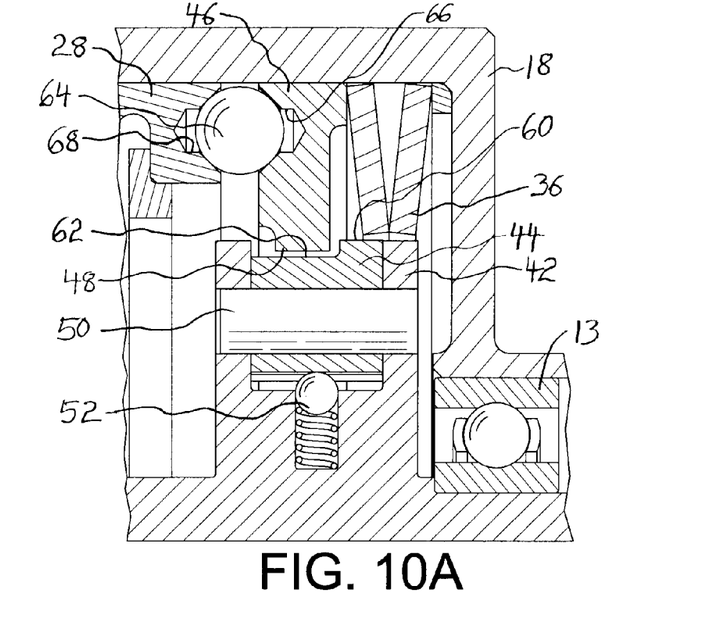
FIGS. 10A and 10B are enlarged cross-sectional views illustrating axial displacement of a lockout ring of the lockout mechanism from a non-lockout position to a lockout position when the torque limit is exceeded.
Figure 10B:
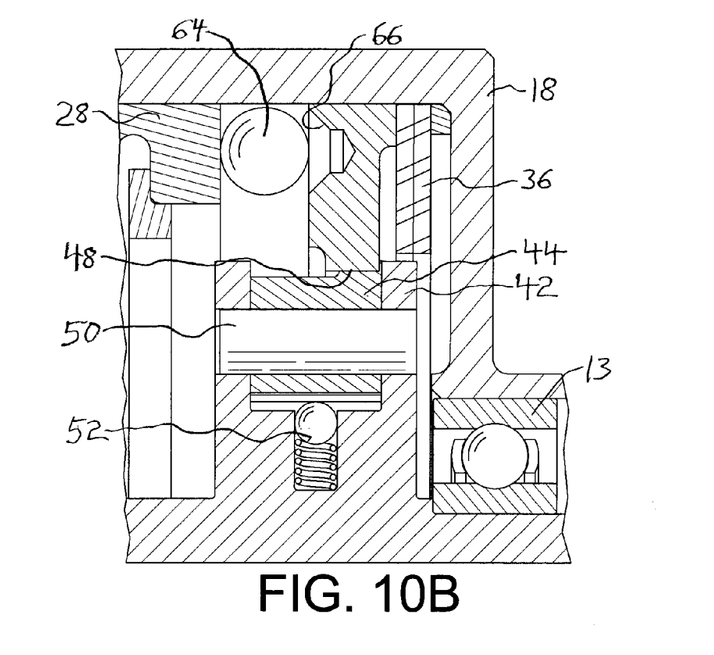

As best seen in FIGS. 8, 9, and 10A, each pawl member 44 may be pivotally mounted on pawl carrier 42 by a pivot pin 50, and releasably held in a neutral pivot position as shown in FIG. 8 by a radially-directed spring-loaded ball plunger 52 seated in pawl carrier 42. When pawl member 44 is in its neutral position, ball plunger 52 engages a central recess 54 of the pawl member. Each pawl member 44 may also include lateral recesses 56 on opposite sides of central recess 54 for engagement by ball plunger 52 when pawl member 44 pivots about an axis defined by pivot pin 50, as will be described later below. Each pawl member 44 may have a pair of catch members 58 extending in opposite lateral directions relative to pivot pin 50, and an outer tab 60 in radial alignment with ball plunger 52. In the illustrated embodiment, tab 60 is adjacent a radial clearance surface 62 in a direction of main axis 11. As will be understood, radial clearance surfaces 62 of pawl members 44 are axially aligned with stops 48 of lockout ring 46 when lockout ring 46 is in its non-lockout axial position, such that pawl carrier 42 is free to rotate relative lockout ring 46 without any of the pawl members 44 engaging any of the stops 48. Thus, pawl carrier 42 is free to rotate with input shaft 12 about main axis 11 under normal operating conditions.

Lockout mechanism 40 may also comprise spring 36 arranged to urge the lockout ring 46 toward the non-lockout position, and a plurality of ball bearings 64 seated between lockout ring 46 and reference gear 28. Ball bearings 64 are seated so as to maintain lockout ring 46 in the non-lockout position when lockout ring 46 and reference gear 28 are in a predetermined angular orientation about main axis 11 relative to one another, and to displace lockout ring 46 toward the lockout position when the reference gear 28 rotates about main axis 11 relative to lockout ring 46. For example, ball bearings 64 may be seated within a corresponding set of pockets 66 in lockout ring 46 and another corresponding set of pockets 68 in reference gear 28, and the ball bearings 64 roll out of respective pockets 66 and 68 incident to rotation of reference gear 28 relative to lockout ring 46.

Operation of GRA 10 and lockout mechanism 40 is now described. Under normal operating conditions, torque applied to input shaft 12 rotates the input shaft about main axis 11, thereby rotating input gear 26 about main axis 11. The rotation of input gear 26 causes counter-rotation of transmitting gears 32. The transmitting gears 32 are meshed with reference gear 28, which remains stationary under normal loading conditions, such that the transmitting gears 32 orbit about input gear 26. The rotation of transmitting gears 32 causes driven gear 30 to rotate, which in turn causes output shaft 14 to rotate for displacing a load, e.g. moving an aircraft control surface.

Under certain abnormal or unexpected operating conditions, such as the malfunction or jamming of a control surface panel, rotation of output shaft 14 is impeded while input torque continues to be applied, and a sudden increase in torque at the output shaft occurs. Consequently, transmitting gears 32 experience increased torque loading and thus transmit additional torque to reference gear 28. When a designed torque limit is exceeded, static friction is overcome and reference gear 28 will move relative to housing 16 by rotating about main axis 11 in the illustrated embodiment. This slippage within GRA 10 helps to prevent structural damage to output shaft 14 and downstream components.

After the torque limit has been exceeded, lockout mechanism 40 is activated to prevent transmission of torque between input shaft 12 and output shaft 14. As reference gear 28 rotates relative to housing 16, it also rotates relative to lockout ring 46, which is prevented from rotation with respect to housing 16 by slide pins 49. This relative angular displacement causes ball bearings 64 to roll out of their respective pockets 66 in lockout ring 46 and pockets 68 in reference gear 28, thereby displacing lockout ring 46 axially toward its lockout position against the bias of spring 36.

Figure 11A:
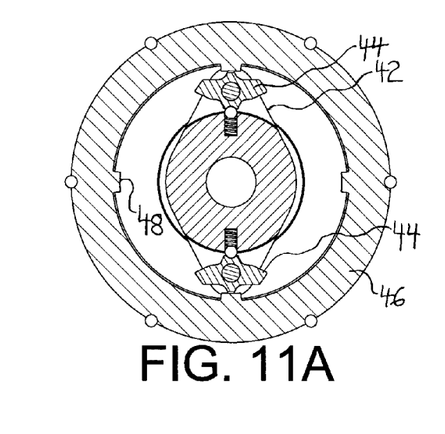
FIGS. 11A-11E are a series of transverse cross-sectional views illustrating operation of the lockout mechanism when the torque limit is exceeded.
Figure 11B:
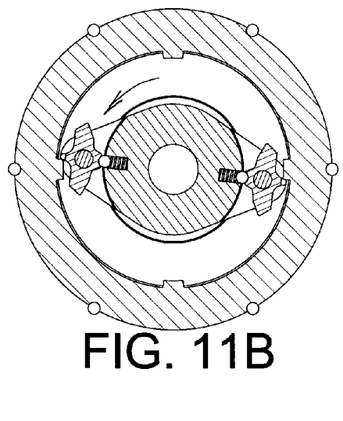
Figure 11C:
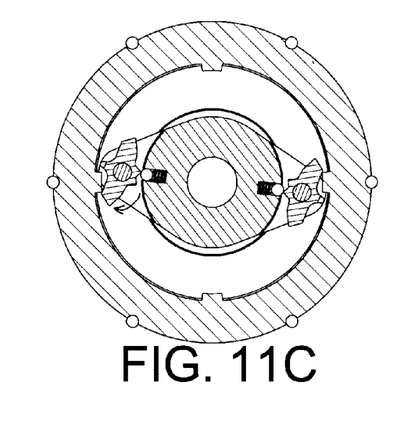
Figure 11D:
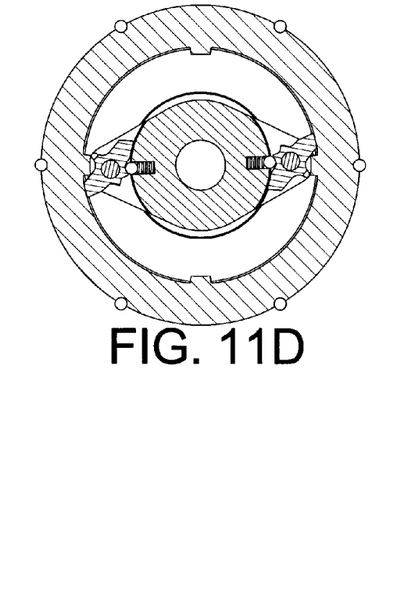
Figure 11E:
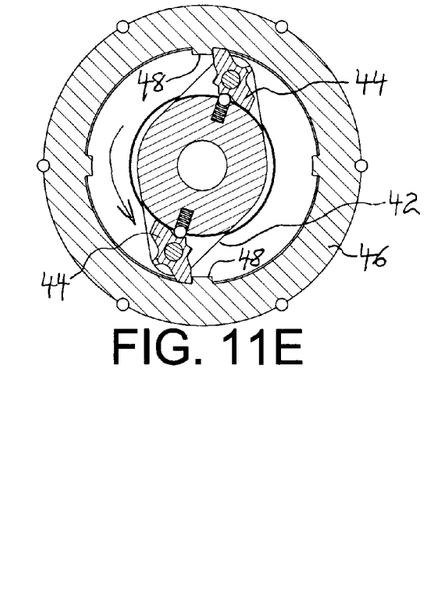

Reference is now made to FIGS. 11A-11E, which illustrate what happens once lockout ring 46 is in its lockout position and input shaft 12. In FIG. 11A, lockout ring 46 is still in its non-lockout position, whereas in FIG. 11B, lockout ring has been axially displaced to its lockout position. When lockout ring 46 is in its lockout position, stops 48 interfere radially with the circular travel path of tabs 60 on pawl members 44. As pawl carrier 42 rotates, tab 60 of a pawl member 44 engages a stop 48 as shown in FIG. 11B. As depicted in FIG. 11C, this engagement causes pawl member 44 to pivot about an axis defined by pivot pin 50, thereby compressing ball plunger 52 as the ball plunger moves out of central recess 54 in the pawl member. Rotation of pawl carrier 42 continues, accompanied by further pivoting of pawl member 44, until ball plunger 52 resiliently decompresses and is received within a lateral recess 56 in pawl member 44, as may be seen in FIG. 11D. At this stage, pawl member 44 is set in a lockout pivot position wherein one of its catch members 58 will radially interfere with stops 48 and the other catch member 58 will be braced against pivoting by engagement with pawl carrier 42. As pawl carrier 42 continues to rotate about main axis 11, the cocked pawl member 44 will engage the next stop 48 as shown in FIG. 11E. Consequently, transmission of torque between input shaft 12 and output shaft 14 is prevented. In the embodiment described herein, torque from input shaft 12 is redirected by lockout mechanism 40 to the structural ground provided by housing 16.

Figure 12A:
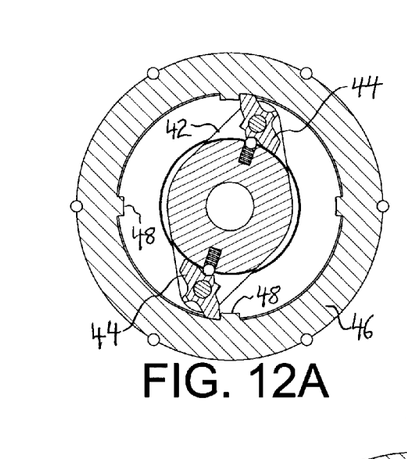
FIGS. 12A-12E are a series of transverse cross-sectional views illustrating resetting of the lockout mechanism by counter-rotation of a pawl carrier of the lockout mechanism.
Figure 12B:
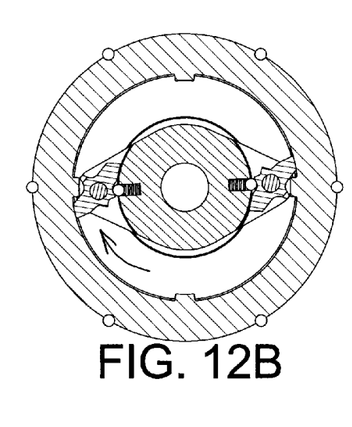
Figure 12C:
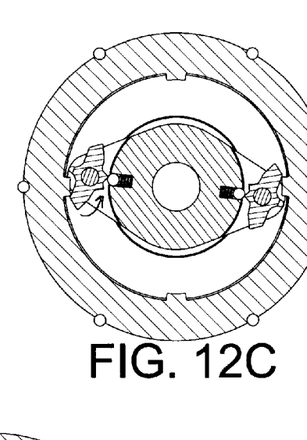
Figure 12D:
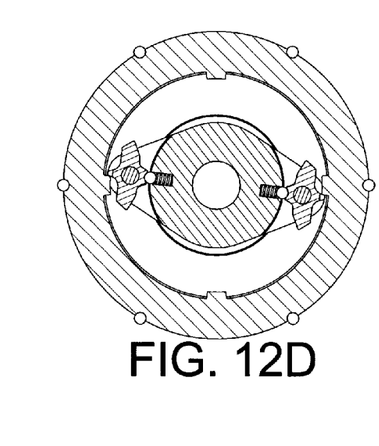
Figure 12E:
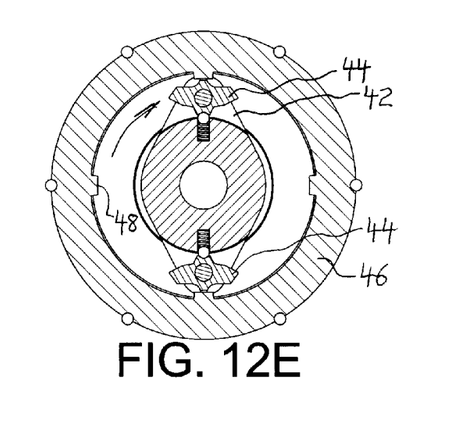

FIGS. 12A-12E illustrate how lockout mechanism 40 may be reset by commanding counter-rotation of input shaft 12 to thereby counter-rotate pawl carrier 42. Initially, it will be understood that ball bearings 64 have already realigned with pockets 66 and 68, and the bias of spring 36 has returned lockout ring 46 to its non-lockout axial position. Pawl carrier 42 and pawl members 44 begin from the full lockout condition depicted in FIG. 12A (this is the same condition shown in FIG. 11E). Pawl carrier 42 is counter-rotated until the trailing, radially outer catch member 58 engages the previous stop 48 as shown in FIG. 12B. As may be understood from FIG. 12C, this causes pawl member 42 to pivot about the axis of pivot pin 50, thereby compressing ball plunger 52 as pawl carrier 42 continues its counter-rotation. Proceeding to FIG. 12D, it will be seen that further counter-rotation of pawl carrier 42 causes pawl member 44 to continue pivoting until ball plunger resiliently decompresses and is received in central recess 54. Consequently, as shown in FIG. 12E, pawl member 44 is now reset with radial clearance relative to stops 48 of lockout ring 46.

Figure 13:
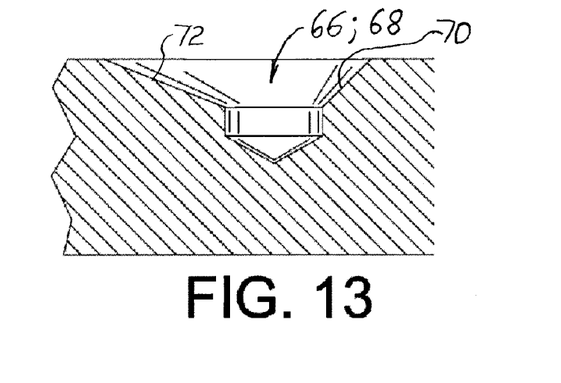
FIG. 13 is a detailed cross-sectional view illustrating an asymmetrical ball pocket in accordance with an embodiment of the present invention.

As best seen in FIG. 13, the pockets 66 in lockout ring 46 and pockets 68 in reference gear 28 may have a first slope 70 associated with a first angular direction about main axis 11, and a second slope 72 associated with a second angular direction about the main axis opposite the first angular direction, wherein the first slope differs from the second slope. In this way, the torque required to actuate lockout mechanism 40 may be made greater in one rotational direction, e.g. the rotational direction associated with flap or slat extension, than in the opposite rotational direction, e.g. the rotational direction associated with flap or slat retraction.

Because the torque limiting mechanism of GRA 10 responds to output torque instead of input torque, the lock-up torque limit can be set closer to the maximum operating torque, resulting in a lower limit torque at the output of each GRA. This can result in significant weight savings of not only the GRA itself, but more importantly the downstream structure that it protects.

The output torque sensing GRA described herein also solves the problems associated with the disc brake pack of the prior art. First, the invention eliminates the friction disc brake pack and replaces it with a pawl lockout mechanism. This change drastically reduces the viscous drag torque generated by brake plates and eliminates reliance on friction for positive torque limiting. With as many as thirty GRAs in an aircraft control surface system, this change also greatly reduces the power required by the PCU. Significant reduction in the weight of the entire drive system may be achieved. Second, the invention also has the potential to eliminate the requirement for a skew detection system on some aircraft control surface (e.g. flap and slat) actuation systems, resulting in dramatic improvements in cost, weight and system reliability.

Embodiments of the present invention are described in detail herein, however those skilled in the art will realize that modifications may be made. Such modifications do not stray from the spirit and scope of the invention as defined by the appended claims.

PARTS LIST

10 Geared rotary actuator ("GRA")
11 Main axis
12 Input shaft
13 Rotary bearing
14 Output shaft
15 Rotary bearing
16 Housing (structural ground)
18 Housing shell
20 Housing end plate
22 Spacer ring
24 Radial step surface
26 Input gear
28 Reference gear
30 Driven gear
32 Transmitting gear
36 Spring
40 Lockout mechanism
42 Pawl carrier
44 Pawl member
46 Lockout ring
48 Stop on lockout ring
49 Slide pin
50 Pivot pin
52 Ball plunger
54 Central recess in pawl member
56 Lateral recess in pawl member
58 Catch member of pawl member
60 Tab of pawl member
62 Radial clearance surface of pawl member
64 Ball bearing
66 Ball pocket in lockout ring
68 Ball pocket in reference gear
70 First slope of ball pocket
72 Second slope of ball pocket

What is claimed is:

1. A torque limiter for limiting transmission of torque between an input shaft rotatable about an input axis and an output shaft rotatable about an output axis, the torque limiter comprising:
   a structural ground; and
   a gear assembly for transmitting rotational motion of the input shaft to the output shaft, wherein the gear assembly includes:
      (i) an input gear rotated relative to the structural ground in response to rotation of the input shaft,
      (ii) a reference gear coupled to the structural ground such that the reference gear does not move relative to the structural ground unless a torque limit is exceeded,
      (iii) a driven gear associated with the output shaft, wherein the output shaft is rotated in response to rotation of the driven gear; and
      (iv) at least one transmitting gear engaging the input gear, the reference gear and the driven gear such that rotation of the input shaft causes rotation of the output shaft without causing movement of the reference gear relative to the structural ground unless the torque limit is exceeded, wherein the reference gear moves relative to the structural ground when the torque limit is exceeded;
   wherein the input gear and the reference gear are arranged coaxially with one another along a main axis, and the reference gear rotates about the main axis relative to the structural ground when the torque limit is exceeded;
   wherein the torque limiter further comprises a lockout mechanism for preventing transmission of torque between the input shaft and the output shaft after the torque limit has been exceeded, wherein the lockout mechanism redirects torque from the input shaft to the structural ground after the torque limit has been exceeded;
   wherein the lockout mechanism comprises:
      a pawl carrier arranged to rotate with the input shaft;
      at least one pawl member pivotally coupled to the pawl carrier;
      a lockout ring including at least one stop extending radially inward, wherein the lockout ring is arranged along the main axis and is axially displaceable from a non-lockout position wherein each stop is radially clear of each pawl member to a lockout position wherein each stop radially interferes with each pawl member;
      a spring arranged to urge the lockout ring toward the non-lockout position; and
      a plurality of ball bearings seated between the lockout ring and the reference gear so as to (a) maintain the lockout ring in the non-lockout position when the lockout ring and the reference gear are in a predetermined angular orientation about the main axis relative to one another, and (b) displace the lockout ring toward the lockout position when the reference gear rotates about the main axis relative to the lockout ring.

2. The torque limiter according to claim 1, wherein the gear assembly is a planetary gear assembly in which the input gear is arranged as a sun gear on the input shaft, the reference gear is arranged as a ring gear about the input gear, and the at least one transmitting gear includes a plurality of planet gears arranged between the input gear and the reference gear.

3. The torque limiter according to claim 2, wherein the input gear and the driven gear are arranged coaxially with one another along the main axis.

4. The torque limiter according to claim 3, wherein the plurality of planet gears extend axially in a direction parallel to the main axis.

5. The torque limiter according to claim 3, wherein the reference gear is arranged coaxially with the input gear and the driven gear along the main axis.

6. The torque limiter according to claim 1, wherein the structural ground includes a housing containing the gear assembly.

7. The torque limiter according to claim 6, wherein the reference gear is coupled to the housing by frictional contact.

8. The torque limiter according to claim 7, wherein the frictional contact includes frictional contact between an annular end surface of the reference gear and a radial step surface of the housing.

9. The torque limiter according to claim 8, wherein the frictional contact between the end surface of the reference gear and the radial step surface of the housing is spring-loaded.

10. The torque limiter according to claim 1, wherein the plurality of ball bearings are seated within a corresponding set of pockets in the lockout ring and another corresponding set of pockets in the reference gear.

11. The torque limiter according to claim 10, wherein the pockets in the lockout ring and the pockets in the reference gear have a first slope associated with a first angular direction about the main axis and a second slope associated with a second angular direction about the main axis opposite the first angular direction, and wherein the first slope differs from the second slope.

12. A torque limiter for limiting transmission of torque between an input shaft rotatable about an input axis and an output shaft rotatable about an output axis, the torque limiter comprising:

a structural ground;

a gear assembly for transmitting rotational motion of the input shaft to the output shaft, the gear assembly including a reference gear coupled to the structural ground such that movement of the reference gear relative to the structural ground is dependent upon an output torque at the output shaft;

wherein the reference gear is stationary relative to the structural ground when the output torque is below an output torque limit, and the reference gear moves relative the structural ground when the output torque exceeds the output torque limit; and a lockout mechanism for preventing transmission of torque between the input shaft and the output shaft after the torque limit has been exceeded;

wherein the lockout mechanism redirects torque from the input shaft to the structural ground after the torque limit has been exceeded; and wherein the lockout mechanism is actuated by rotational motion of the reference gear relative to the structural ground.

13. The torque limiter according to claim 12, wherein the gear assembly further includes an input gear arranged to rotate with the input shaft and a plurality of transmitting gears meshing with the input gear and the reference gear.

14. The torque limiter according to claim 13, wherein the gear assembly further includes a driven gear by which rotation is transmitted to the output shaft, and wherein the plurality of transmitting gears also mesh with the driven gear.

* * * * *